(12) United States Patent
Kadaba Chaluvaiah et al.

(10) Patent No.: US 11,630,591 B1
(45) Date of Patent: Apr. 18, 2023

(54) SYSTEM AND METHOD TO MANAGE STORAGE SYSTEM FOR STARTUP

(71) Applicant: Dell Products L.P., Round Rock, TX (US)

(72) Inventors: Swamy Kadaba Chaluvaiah, Round Rock, TX (US); Murali Manohar Shanmugam, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 45 days.

(21) Appl. No.: 17/495,430

(22) Filed: Oct. 6, 2021

(51) Int. Cl.
*G06F 12/00* (2006.01)
*G06F 3/06* (2006.01)
*G06F 9/4401* (2018.01)

(52) U.S. Cl.
CPC .......... *G06F 3/0632* (2013.01); *G06F 3/0604* (2013.01); *G06F 3/067* (2013.01); *G06F 3/0631* (2013.01); *G06F 3/0659* (2013.01); *G06F 9/4406* (2013.01)

(58) Field of Classification Search
CPC .... G06F 11/1417; G06F 11/1433; G06F 8/00; G06F 12/00
See application file for complete search history.

(56) References Cited

U.S. PATENT DOCUMENTS 7,073,053 B1 * 7/2006 Oz ...................... G06F 11/1433
714/36

* cited by examiner

*Primary Examiner* — Yong J Choe
(74) *Attorney, Agent, or Firm* — Womble Bond Dickinson (US) LLP

(57) ABSTRACT

Methods and systems for managing data for startup purposes in a distributed system are disclosed. The distributed system may include any number of clients operably connected to a storage system via a connection fabric. By virtue of the connection topology, any of the clients may interact with the storage system to gain access to storage resources of the storage system. When a client is provided access to storage resources by the storage system, other clients may not be able to access the storage resources of the storage system.

20 Claims, 9 Drawing Sheets

SYSTEM AND METHOD TO MANAGE STORAGE SYSTEM FOR STARTUP

FIELD OF THE INVENTION

Embodiments of the present invention relate generally to device startup. More particularly, embodiments of the invention relate to systems and methods to manage data access for startup.

BACKGROUND

Computing devices may store data and used stored data. For example, computing devices may utilize data when providing computer implemented services. If computing devices are unable to access data, the computing devices may be unable to provide some, or all, of the computer implemented services that they are able to provide with access to data.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
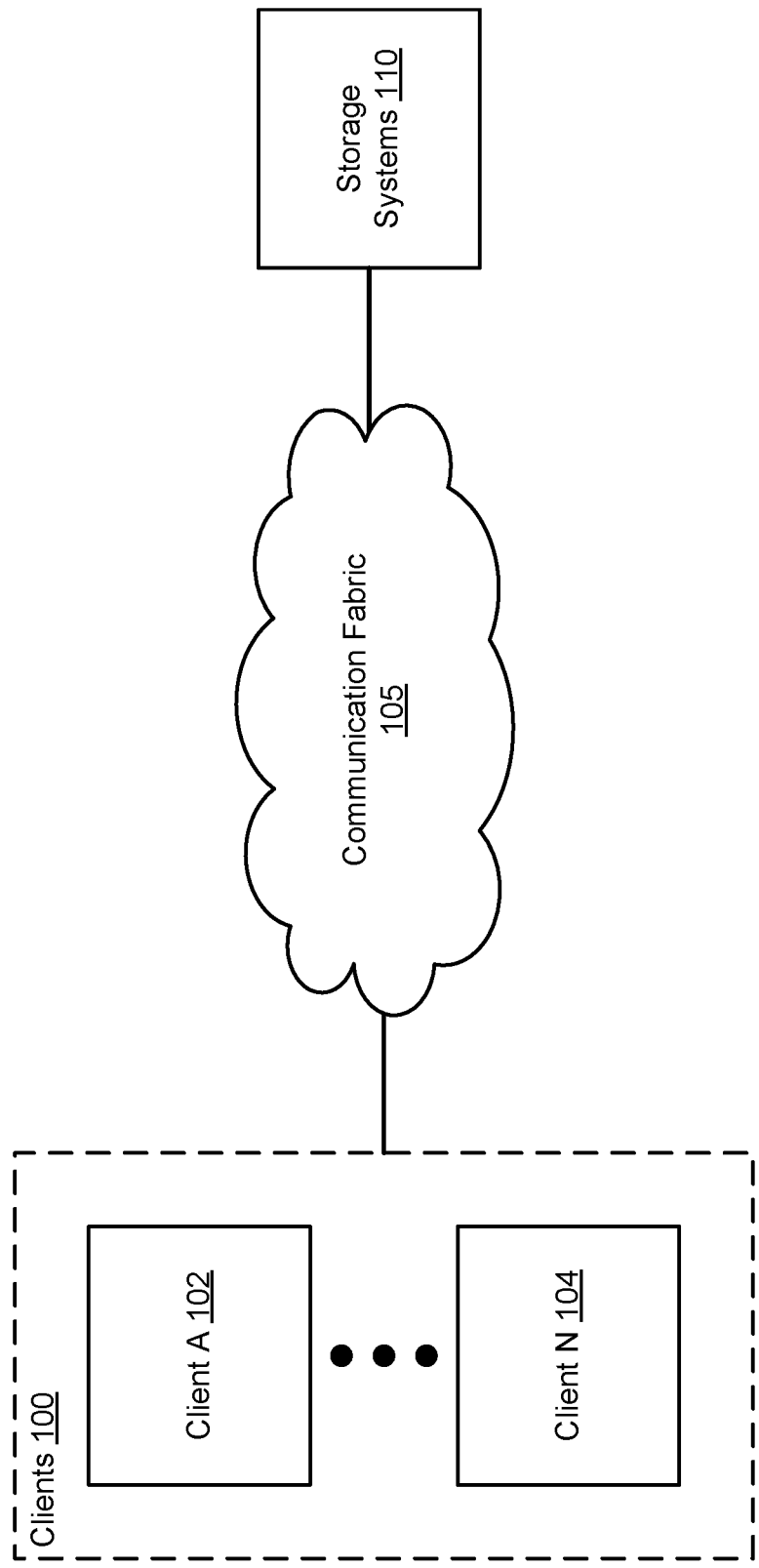
FIG. 1 is a block diagram illustrating a system in accordance with an embodiment.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

In general, embodiments of the invention relate to methods and systems for managing data for startup purposes in a distributed system. The distributed system may include any number of clients operably connected to a storage system via a connection fabric. By virtue of this connection topology, any of the clients may interact with the storage system to gain access to storage resources of the storage system. When a client is provided access to storage resources by the storage system, other clients may not be able to access the storage resources of the storage system.

During startup, any of the clients may need to access data stored in storage resources of the storage system. For example, startup data used to begin execution of operating system or other entities may be stored in the storage system. Consequently, the clients may be unable to complete startup processes with handoff to operating system (or other types of management entities) if the client are unable to access the startup data.

To improve the likelihood of the client being able to access startup data, the storage system may lock access to some storage resources in which the startup data for a client is stored. To lock access to the storage resources, the storage system may create an association between the client and a namespace for the storage resources. When future requests for access to the storage resources are received, the storage system may check previously generated associations to determine whether the storage resources have been locked for exclusive use by the requesting entity. If locked, then the storage system may only provide access to the storage resources, and startup data stored in the storage resources, if the association indicates that the requesting entity is to be provided with access to the storage resources.

To lock storage resource, the clients may generate and provide lock requests to the storage system. The lock requests may, after resources are allocated to a client, specify to which client to lock the resources, an identifier of the namespace associated with the storage resources, and information regarding a type of the lock request. The type of the lock request may specify, for example, whether the resources are to be locked for a period of time (e.g., specified by the request) or whether the resources are to continue to be locked until an explicit unlock request for the resources is received.

In this manner, an embodiment disclosed herein may ensure that clients are able to boot to the same operating system during each boot.

In an embodiment, a computer-implemented method for operating a client during startup from power-on to handing off to a booted operating system is provided. The method may include establishing, by a startup manager of the client, a session with a controller of a storage system in which startup data for the client is stored, the storage system being operably connected to multiple clients; providing, by the startup manager, namespace information associated with storage resources of the storage system in which the startup data is stored and an identity of the client to obtain access to the storage resources, the storage resources being locked by the storage system for exclusive use by the client; copying, by the startup manager, a portion of the startup data to memory using the access to the storage resources; and booting, by the startup manager, the client to the operating system and terminating the session; establishing, by the operating system, a second session with the storage system to obtain access to the storage resources; and updating, by the operating system, the startup data in the storage resources to change a future boot to the operating system.

The method may also include, prior to establishing the session with the controller and during a previous session with a second controller of the storage system: requesting, by the startup manager, a storage resource allocation for the storage resources; obtaining, by the startup manager, the namespace information as a response to the storage resource allocation request; storing, by the startup manager, the startup data in the storage resources; and request, by the startup manager, that the storage resources be locked to the client.

Requesting that the storage resources be locked to the client may include generating a data structure specifying: an identifier of the client; an identifier of the second controller; the namespace information; an identifier of the storage system; and a reservation type.

In an embodiment, the reservation type is a timer based reservation indicating that the storage resources are to be locked to the client for a duration of time.

In an embodiment, the reservation type is a command based reservation indicating that the storage resources are to be locked to the client until an explicit unlock resources request for the storage resources and from the client is processed by the storage system.

Establishing the session with the controller may include establishing, by the startup manager, an internet protocol connection to the storage system; receiving, by the startup manager, an identifier of the controller; and communicating, by the startup manager, with the identified controller using the transmission control protocol and/or internet protocol.

The client, the multiple clients, and the storage system may be operably connected via an internet protocol based fabric.

A non-transitory media may include instructions that when executed by a processor cause the computer-implemented method to be performed.

A data processing system may include the non-transitory media and a processor, and may perform the computer-implemented method when the computer instructions are executed by the process.

Turning to FIG. 1, a block diagram illustrating a system in accordance with an embodiment is shown. The system shown in FIG. 1 may facilitate booting computing devices in a reliable manner by improving the likelihood that data used to boot the computing devices to operating systems or other types of management systems is available during the boot process. The system may include, but is not limited to, one or more clients 100 communicatively coupled to one or more storage systems 110. Each of these components is discussed below.

All, or a portion, of clients 102-104 may provide computer implemented services to users and/or other computing devices operably connected to the clients 100. The computer implemented services may include any type and quantity of services including, for example, database services, instant messaging services, video conferencing services, etc. To provide these services, clients 100 may host applications that provide these (and/or other) computer implemented services. The applications (or other types of executing entities) may presume (and/or may require for proper operation of the applications) that a client hosting an application is operating in a predetermined manner. The predetermined manner of operation may include, for example, executing an operating system, drivers, or other type of management entities that mediate, facilitate, or otherwise operate in a manner which enables the applications to operate (e.g., by providing abstracted access to hardware resources used in the execution of the applications).

To operate in the predetermined manner, clients 100 may perform one or more operations to enter the predetermined manner of operation (by changing from other manners of operation to the predetermined manner of operation). These operations may include, for example, a boot process from a power-on (or reset or other manner of operation that differs from the predetermined manner of operation to the extent that the applications may not be able to operate) to hand off operation of the client to an operating system or other type of operational management entity that places clients 100 into the predetermined manner of operation. The operating system may, for example, provide abstracted access to resources utilized by the applications hosted by the client.

For example, consider a scenario where a client has been shut off. After the client is turned on, the client may be operating in a startup manner such that the client is not yet able to support execution of an application (e.g., the application may not be able to successfully execute until the client hosts an operating system). To enter the predetermine manner of operation conductive to execution of the application, the client may go through a boot process which may be performed by a type of management entity such as a basic input-output system and/or other startup management entities. The management entity may perform any number of actions (e.g., a "boot process") to prepare the client to begin execution of an operating system or other type of management entity.

These actions may include, for example, inventorying the hardware components hosted by a client, loading drivers or other software components, configuring hardware and/or software components, etc. As part of the boot process, the management entity may also load code, configuration settings, and/or other data corresponding to an operating system (or other management entity type or other types of executing entities) to memory. The data may be stored in persistent storage thereby allowing it to be read into memory.

Once the data is loaded into memory, the client may initiate execution of code (e.g., computer instructions) included in the data in memory to begin operation of the operating system. The executing code may utilize configuration settings and/or other information also included in the data in memory.

As the operating system executes, the data in persistent storage may be updated such that, if execution of the operating system is suspended/stopped/etc. due to, for example, a shutdown, restart, error, or other condition, then execution of the operating system may be restarted, resumed, etc. in a manner that is consistent, at least in part, with previous execution of the operating system. For example, by changing a configuration stored in the data in the persistent storage, the operating system may, upon restart, operate in accordance with the changed configuration rather than a previous or otherwise different configuration setting. Changes to code or other data may be similarly saved for future use during future boot processes.

In an embodiment, clients 100 store the data used during the boot process in storage systems 110. Storage systems 110 may be operably connected to clients 100 via communication fabric 105. Consequently, any of clients 100 may operably connect to storage systems 110. To obtain the data used during the boot process from storage systems 110, a client may need to be able to access the data in the storage systems 110.

In an embodiment, storage systems 110 store the data used to boot the respective clients 100 in a manner that prevents concurrent access to the data. For example, if a first client stores data usable to perform a boot process in the storage systems 110, then the first client may be unable to access the stored data if the data is being accessed by another client while the first client attempts to access the stored data. Consequently, clients 100 may be unable to complete their respective startup processes to enter predetermined operating manners necessary to provide computer implemented services.

To reduce the likelihood of any of the clients 100 being unable to access the data in storage systems 110 to complete their startup processes, in an embodiment, the clients 100 and storage systems 110 may restrict access to data stored in the storage systems 110. For example, when a client stores data in the storage systems 110, the client may initiate a lock for the data that prevents other clients from accessing and/or becoming aware of the data. When stored data is locked, the storage systems 110 may only provide access to it when a corresponding client also provides an identifier associated with the stored data during a subsequent data access. Because other clients may not have access to (i) the identity of the client that stored the data and (ii) an identifier for the stored data, the other clients may not be able to access the stored data. Consequently, the storage systems 110 may provide clients 100 with exclusive access to data used by the respective clients 100 during their respective startups or other processes to enter the predetermined manner of operating. Through the exclusive access to the stored data, the corresponding clients may be more likely to have access to the data necessary to enter the predetermined manner of operating.

Clients 102-104 may be implemented using a computing device such as a host or server, a personal computer (e.g., desktops, laptops, and tablets), a "thin" client, a personal digital assistant (PDA), a Web enabled appliance, or a mobile phone (e.g., Smartphone), or any other type of data processing device or system. For additional details regarding computing devices, refer to FIG. 7. For additional details regarding clients 100, refer to FIG. 2C.

In an embodiment, communication fabric 105 includes one or more networks that facilitate communication between clients 100 and storage systems 110. In an embodiment, communication fabric 105 supports Non-Volatile Memory Host Controller Interface Specification (NVMe) communications. For example, clients 100 may communicate with storage systems 110 using the NVMe over fabric (NVMe-oF) communication protocol. In this manner, regardless of whether the storage systems 110 are local to or remote from the clients 100, storage systems 110 may be reachable by clients 100 via communication fabric 105. In a scenario where storage systems 110 are remote to clients 100, communication fabric 105 may include an internet protocol (IP) network that supports at least the transport communications protocol (TCP). To facilitate communications, clients 100, communication fabric 105, and/or storage systems 110 may establish corresponding session (e.g., TCP sessions) through which clients 100 and storage systems 110 communicate.

Storage systems 110 may be implemented with a computing device such as a host or server, a personal computer (e.g., desktops, laptops, and tablets), a "thin" client, a personal digital assistant (PDA), a Web enabled appliance, or a mobile phone (e.g., Smartphone), an embedded system, local controllers, and/or any other type of data processing device or system. For additional details regarding computing devices, refer to FIG. 7. For additional details regarding storage systems 110, refer to FIGS. 2A-2B.

While illustrated in FIG. 1 as included a limited number of specific components, a system in accordance with an embodiment may include fewer, additional, and/or different components than those illustrated therein.

Figure 2A:
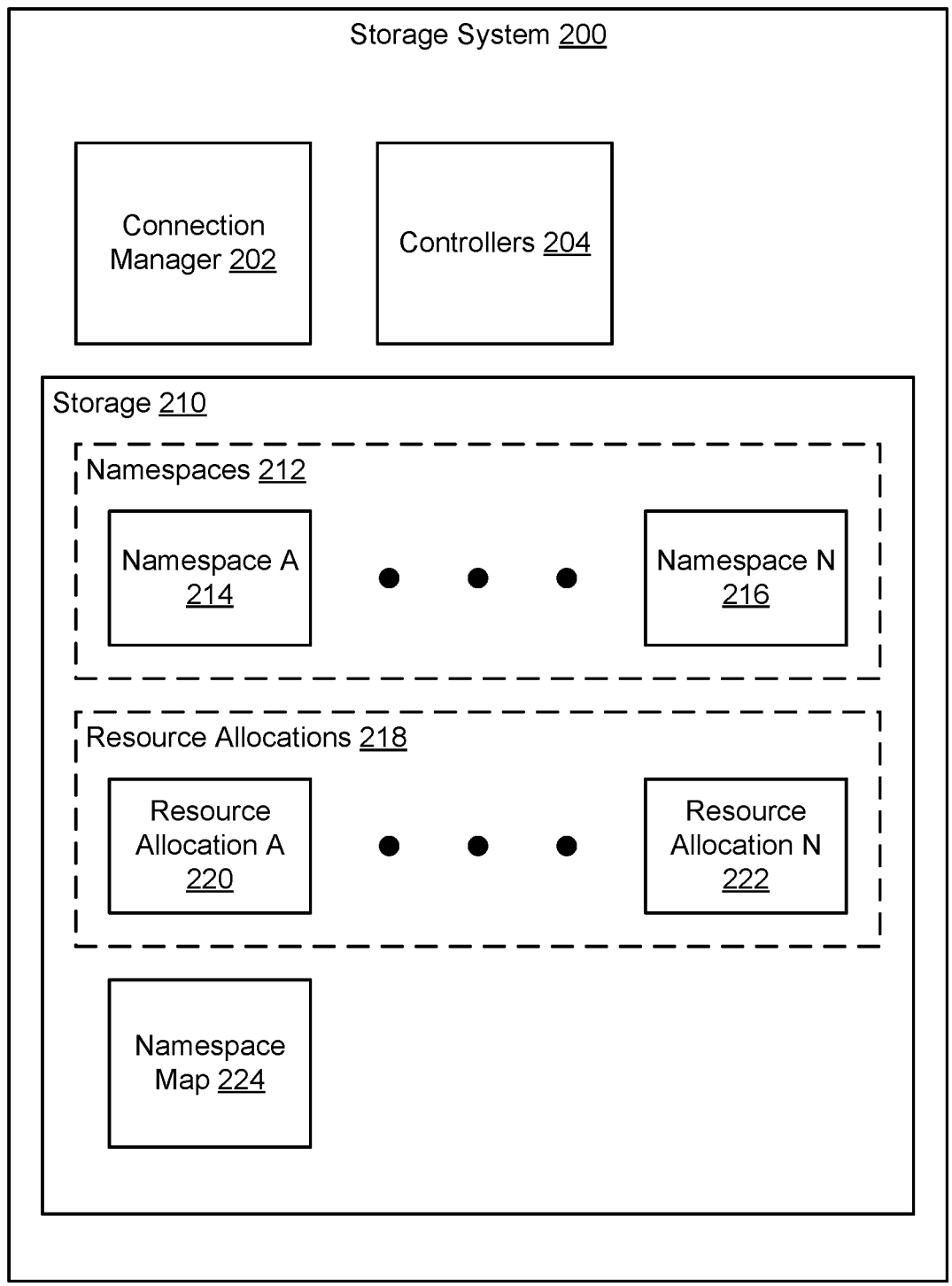
FIG. 2A is a block diagram illustrating a storage system in accordance with an embodiment.

Turning to FIG. 2A, a diagram of an example storage system 200 in accordance with an embodiment is shown. Storage system 200 may be similar to any of storage systems 110.

Storage system 200 may (i) store data from clients, (ii) provide access to stored data to the clients, and (iii) restrict access to the stored data. By restricting access to some of the data, storage system 200 may increase the likelihood that clients have access to data stored in storage 210 that is used during boot processes.

Storage system 200 may include connection manager 202, controllers 204, and storage 210. Each of these components is discussed below.

Connection manager 202 may facilitate communications with clients 100 and/or other devices. To do so, connection manager 202 may cooperate with clients 100 to establish session over which information is exchanged. Connection manager 202 may support communications in accordance with, for example, the NVMe communications protocol.

Controllers 204 may manage client access to various storage resources of storage 210. Clients 100 may store startup data in the storage resources of storage 210. To manage client access to the storage resources, controllers 204 may store information regarding previous client access to the storage resources and limit client access using the stored information.

For example, controllers 204 may maintain a namespace map 224. Namespace map 224 may include one or more data structures that include information regarding which storage resources of storage 210 corresponding clients may access and/or information which a client must provide to be allowed to access various storage resources. When a client, for example, requests access to storage resources and/or requests information regarding storage resources, controllers 204 may use the information included in namespace map 224 to determine whether to (i) provide the client with access to the storage resources, (ii) indicate that access to the storage resources is denied, and/or (iii) indicate that the storage resources and/or data stored in the storage resources does not exist. For additional details regarding namespace map 224, refer to FIG. 2B.

For clients that are provided access to storage resources, controllers 204 may provide the clients with copies of data from the storage resources and/or store data from the allowed clients in the storage resources. For example, controllers 204 may service data access requests from the allowed clients (e.g., via communication fabric 105). In contrast, data access requests from clients that are not provided access to the storage resources may not be serviced by controllers 204 or may be serviced in a manner (e.g., by sending error messages, access denial messages, etc., rather than providing access to the storage resources) that prevents the not allowed clients from utilizing the storage resources and/or data stored therein.

In an embodiment, the controllers are adapted to service lock commands from the clients. A lock command may be a request to lock access to storage resources to the client. The lock command indicate (e.g., include, have information relating to), for example, an identifier of the client, an identifier of a controller, namespace information such as an identifier of a namespace for storage resources; a qualifier of the client, and a reservation type. The reservation type may indicate how access to the storage resources is to be limited over time. For example, the reservation type may specify whether the storage resources are to be locked for a duration of time (e.g., which may be specified by the lock command directly or indirectly such as with a reference), are to be locked until explicitly unlocked, or in other manners.

When providing their functionalities, connection manager 202 and/or controllers 204 (e.g., collectively a "data manager") may perform all, or a portion, of the methods illustrated in FIGS. 3-6.

In an embodiment, connection manager 202 and/or controllers 204 is implemented using a hardware device including circuitry. The hardware device may be, for example, a digital signal processor, a field programmable gate array, or an application specific integrated circuit. The circuitry may be adapted to cause the hardware device to perform the functionality of connection manager 202 and/or controllers 204. Connection manager 202 and/or controllers 204 may be implemented using other types of hardware devices without departing from the invention.

In one embodiment, connection manager 202 and/or controllers 204 is implemented using a processor adapted to execute computing code stored on a persistent storage that when executed by the processor performs the functionality of connection manager 202 and/or controllers 204 discussed throughout this application. The processor may be a hardware processor including circuitry such as, for example, a central processing unit or a microcontroller. The processor may be other types of hardware devices for processing digital information without departing from the invention.

When performing the methods illustrated in FIGS. 3-6, connection manager 202 and/or controllers 204 may store data in storage 210.

In an embodiment, storage 210 is implemented using physical devices that provide data storage services (e.g., storing data and providing copies of previously stored data). The devices that provide data storage services may include hardware devices and/or logical devices. For example, storage 210 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 210 may include a memory device (e.g., a dual in line memory device) in which data is stored and from which copies of previously stored data are provided. In another example, storage 210 may include a persistent storage device (e.g., a solid-state disk drive) in which data is stored and from which copies of previously stored data is provided. In a still further example, storage 210 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 210 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

In an embodiment, storage 210 is implemented with flash storage. The flash storage may be a high performance storage medium.

Storage 210 may store data structures including namespaces 212, resource allocations 218, and namespace map 224. Each of these data structures is discussed below.

Namespaces 212 may include one or more data structures used to organize the storage resources of storage 210 into resource allocations 218. For example, namespaces 212 may include information regarding different namespaces (e.g., 214, 216). Each of the namespaces may include information usable to access corresponding resource allocations. The information may include, logical to physical address mappings, physical address ranges, identifiers for the namespaces, and/or other information usable to facilitate access to corresponding resource allocations.

Resource allocations 218 may include one or more data structures in which client data is stored. Any number of resource allocations (e.g., 220, 222) may be instated using the storage resources of storage 210. The client data stored in resource allocations 218 may be usable, for example, to complete boot processes, other types of startup processes, and/or to perform other processes. As discussed above, the various resources allocations may be locked to corresponding clients so that the clients may be more likely to be able to access data utilized during startup.

In an embodiment, a client to which a resource allocation (e.g., 220, 222) is allocated may structure (e.g., by installing input-output management data structure, file systems, etc.) the resource allocation and/or store data such as operating systems in the structure resource allocation. The storage system 200 may not otherwise manage the data stored in the resource allocations.

Figure 2B:
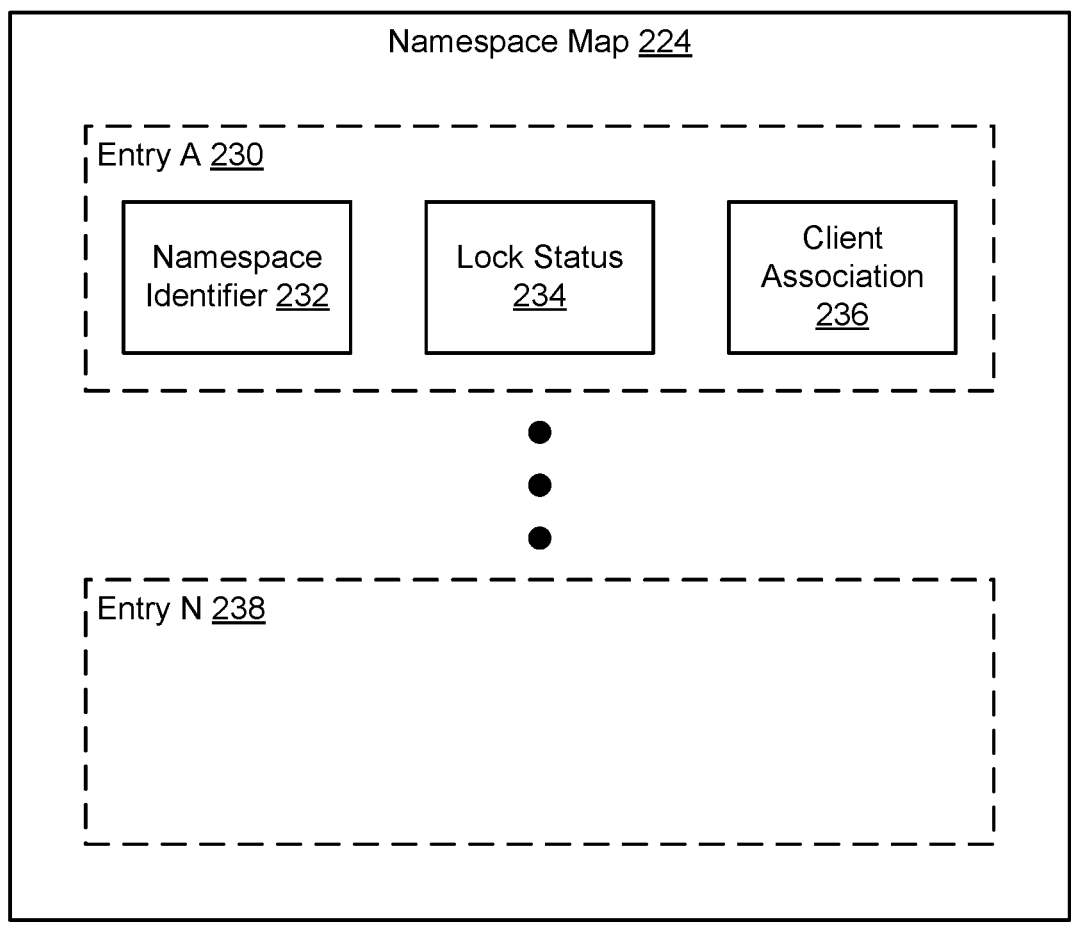
FIG. 2B is a block diagram illustrating a namespace map in accordance with an embodiment.

Namespace map 224 may include one or more data structures which include information usable to manage access to the resource allocations 218, as discussed above. For example, namespace map 224 may be implemented as a lookup data structure that maps identifiers of namespaces and clients to lock statuses for the resource allocations associated with the namespaces 212. Refer to FIG. 2B for additional details regarding namespace map 224.

The data structures stored in storage 210 may be implemented using, for example, lists, tables, unstructured data, trees, databases, etc. While illustrated in FIG. 2A as being stored locally, the data structures may be stored remotely and may be distributed across any number of devices without departing from embodiments of the invention.

While illustrated in FIG. 2A as including a limited number of specific components, a storage system in accordance with an embodiment may include fewer, additional, and/or different components than shown herein.

Turning to FIG. 2B, a diagram of namespace map 224 in accordance with an embodiment is shown. Namespace map 224 may include any number of entries 230, 238. Each of entries 230, 238 may include information corresponding to a locked resource allocation that is for exclusive access by a client.

The information included in each of entries 230, 238 may include a namespace identifier 232, a lock status, and a client association 236. The namespace identifier 232 may be an identifier of one of namespaces 212. The namespace identifier 232 may be usable to access the corresponding namespace (e.g., 214, 216).

The lock status 234 may include information regarding (i) whether the namespace identified by namespace identifier 232 is locked and (ii) conditions required to unlock a locked namespace. For example, lock status 234 may specify whether the namespace identified by namespace identifier 232 is locked for a duration of time and/or is locked until an explicit unlock request for the namespace identified by namespace identifier 232 is received.

Client association 236 may include an identifier of a client to which the namespace identified by namespace identifier 232 is locked. For example, the client association 236 may include a globally unique identifier (GUI), universally unique identifier (UUID), client provided name/identifier, and/or other information usable to ascertain to which client a namespace (and associated resource allocation) identified by namespace identifier is locked for exclusive access.

When an access request (e.g., to storage/read data from storage resources associated with the namespace) for a namespace (and/or a request for information about existing namespaces) is received, an identifier of the namespace may be matched against the namespace identifier (e.g., 232) of each of the entries. If a match is made, then the lock status 234 of the matched entry may reviewed to determine whether the namespace is locked. If locked, then the client association 236 of the matched entry may be reviewed to ascertain whether the requestor should be provided with the requested access/information (e.g., based on whether the client association 236 matches the identity of the requestor). If it is determined that the requestor should be provided with the requested access/information, then the storage system may provide that access. In contrast, if it is determined that the requestor should not be provided with the requested access/information, then the storage system may indicate that the storage resources and/or namespace do not exist (to prevent the requestor from obtaining any information regarding the data stored in the storage resources including that the namespace even exists).

Figure 2C:
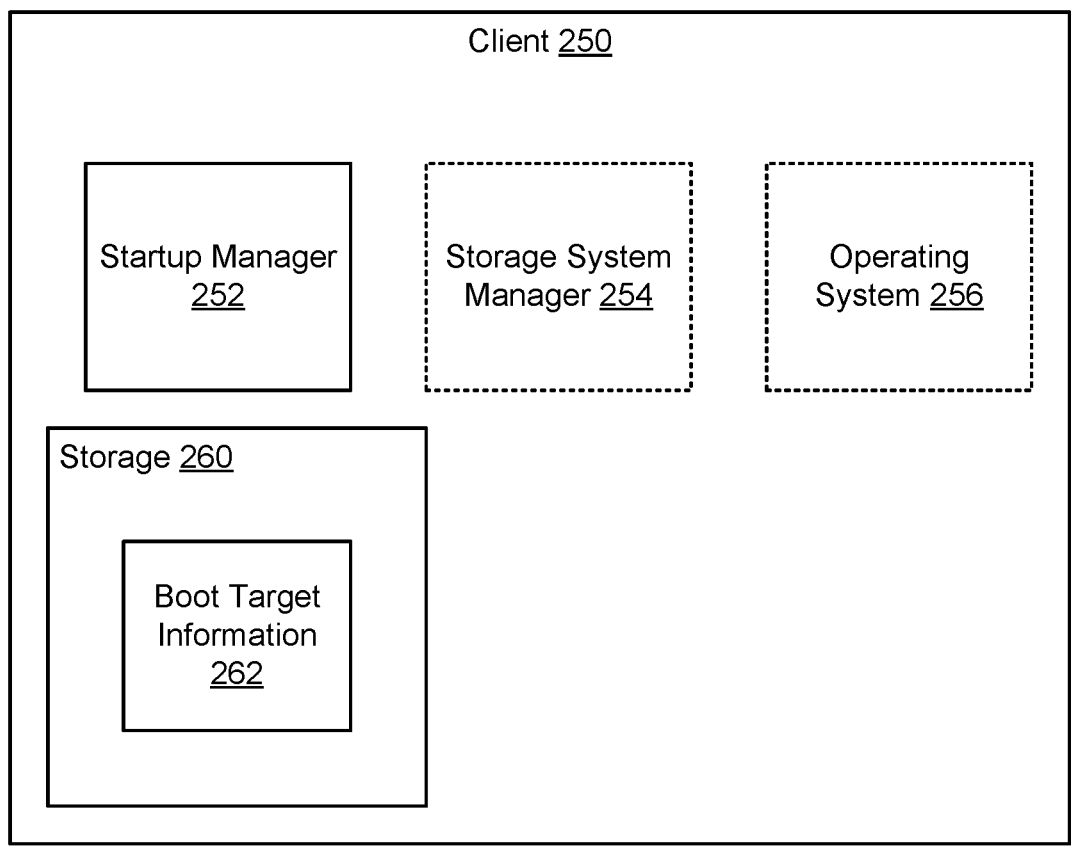
FIG. 2C is a block diagram illustrating a client in accordance with an embodiment.

Turning to FIG. 2C, a diagram of an example client 250 in accordance with an embodiment is shown. Client 250 may be similar to any of clients 100.

Client 250 may (i) may provide computer implemented services while operating in a predetermined state and (ii) use data stored in storage systems 110 to enter the predetermined state. While in the predetermined state, client 250 may execute applications that provide computer implemented services. To provide its functionality, client 250 may include startup manager 252, storage system manager 254, operating system 256, and storage 260. Each of these components is discussed below.

Startup manager 252 may manage the startup of client 250. The startup may include, for example, determining and preparing hardware components for operation, loading data from storage systems 110 into memory, and/or performing other actions to prepare to hand off operational management of client 250 to operating system 256. To load data from storage systems 110 into memory, startup manager 252 may provide information from boot target information 262 to storage systems manager and/or store information in boot target information 262 to enable future access to stored data.

Storage system manager 254 may facilitate communications with storage systems 110 prior to handoff of operational control of client 250 to operating system 256. For example, storage systems manager 254 may establish a session (e.g., TCP session) with storage systems 110 (and/or a controller assigned to cooperate with or service client 250) to allow data in storage resources of storage systems 110 to be read (e.g., by transmitting it from storage systems 110 to client 250 via communication fabric 105).

Operating system 256 may manage the operation of client 250 after startup manager 252 prepares client 250 for execution of operating system 256. As operating system 256 operates (e.g., after execution of code corresponding to operating system 256 begins execution), operating system 256 may establish another session (e.g., a TCP session or other protocol compliant session) to write data to storage resources of storage systems 110 allocated to client 250. The written data may reflect changes to the operation of operating system 256 that enable operating system 256 to operate in a corresponding manner in the future (e.g., future starts of client 250).

In FIG. 2C, storage systems manager 254 and operating system 256 are drawn in dashing to indicate that these components may not be operating when client 250 initially starts, in contrast to startup manager 252. Startup manager 252 may initiate operation of storage systems manager 254 and operating system 256. Startup manager 252 and storage system manager 254 may stop operating once operational management of client 250 is handed off to operating system 256.

When providing their functionalities, startup manager 252, storage system manager 254, and/or operating system 256 (e.g., collectively "operational management entities") may perform all, or a portion, of the methods illustrated in FIGS. 3-6.

In an embodiment, startup manager 252, storage system manager 254, and/or operating system 256 is implemented using a hardware device including circuitry. The hardware device may be, for example, a digital signal processor, a field programmable gate array, or an application specific integrated circuit. The circuitry may be adapted to cause the hardware device to perform the functionality of startup manager 252, storage system manager 254, and/or operating system 256 may be implemented using other types of hardware devices without departing from the invention.

In one embodiment, startup manager 252, storage system manager 254, and/or operating system 256 is implemented using a processor adapted to execute computing code stored on a persistent storage that when executed by the processor performs the functionality of startup manager 252, storage system manager 254, and/or operating system 256 discussed throughout this application. The processor may be a hardware processor including circuitry such as, for example, a central processing unit or a microcontroller. The processor may be other types of hardware devices for processing digital information without departing from the invention.

When performing the methods illustrated in FIGS. 3-6, startup manager 252, storage system manager 254, and/or operating system 256 may store data in storage 260.

In an embodiment, storage 260 is implemented using physical devices that provide data storage services (e.g., storing data and providing copies of previously stored data). The devices that provide data storage services may include hardware devices and/or logical devices. For example, storage 260 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 260 may include a memory device (e.g., a dual in line memory device) in which data is stored and from which copies of previously stored data are provided. In another example, storage 260 may include a persistent storage device (e.g., a solid-state disk drive) in which data is stored and from which copies of previously stored data is provided. In a still further example, storage 260 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 260 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

Storage 260 may store data structures including boot target information 262. Boot target information may include one or more data structures that include information regarding where data usable for startup of client 250 is stored in storage systems 110 (and/or locked for exclusive use by client 250). For example, boot target information 262 may include a namespace identifier, a controller identifier, an identifier for client 250, and/or other information. The aforementioned information may be added to boot target information 262.

For example, to store code and/or other information regarding an operating system, client 250 may connect with storage systems 110 and request a resource allocation. Once allocated, client 250 may store the code and/or other information in the allocation. Client 250 may request a namespace identifier for the resource allocation and request that the namespace and associated resources be locked for the client (e.g., for a duration of time, until a condition occurs, until the storage system receives an explicit unlock request, etc.). The namespace identifier, client identifier, controller identifier, and/or other information may be stored in boot target information 262 so that the client 250 may obtain access to the allocated resources, and data stored therein, in the future.

The data structures stored in storage 260 may be implemented using, for example, lists, tables, unstructured data, trees, databases, etc. While illustrated in FIG. 2C as being stored locally, the data structures may be stored remotely and may be distributed across any number of devices without departing from embodiments of the invention.

While illustrated in FIG. 2C as included a limited number of specific components, a storage system in accordance with an embodiment may include fewer, additional, and/or different components than shown herein.

Figure 3:
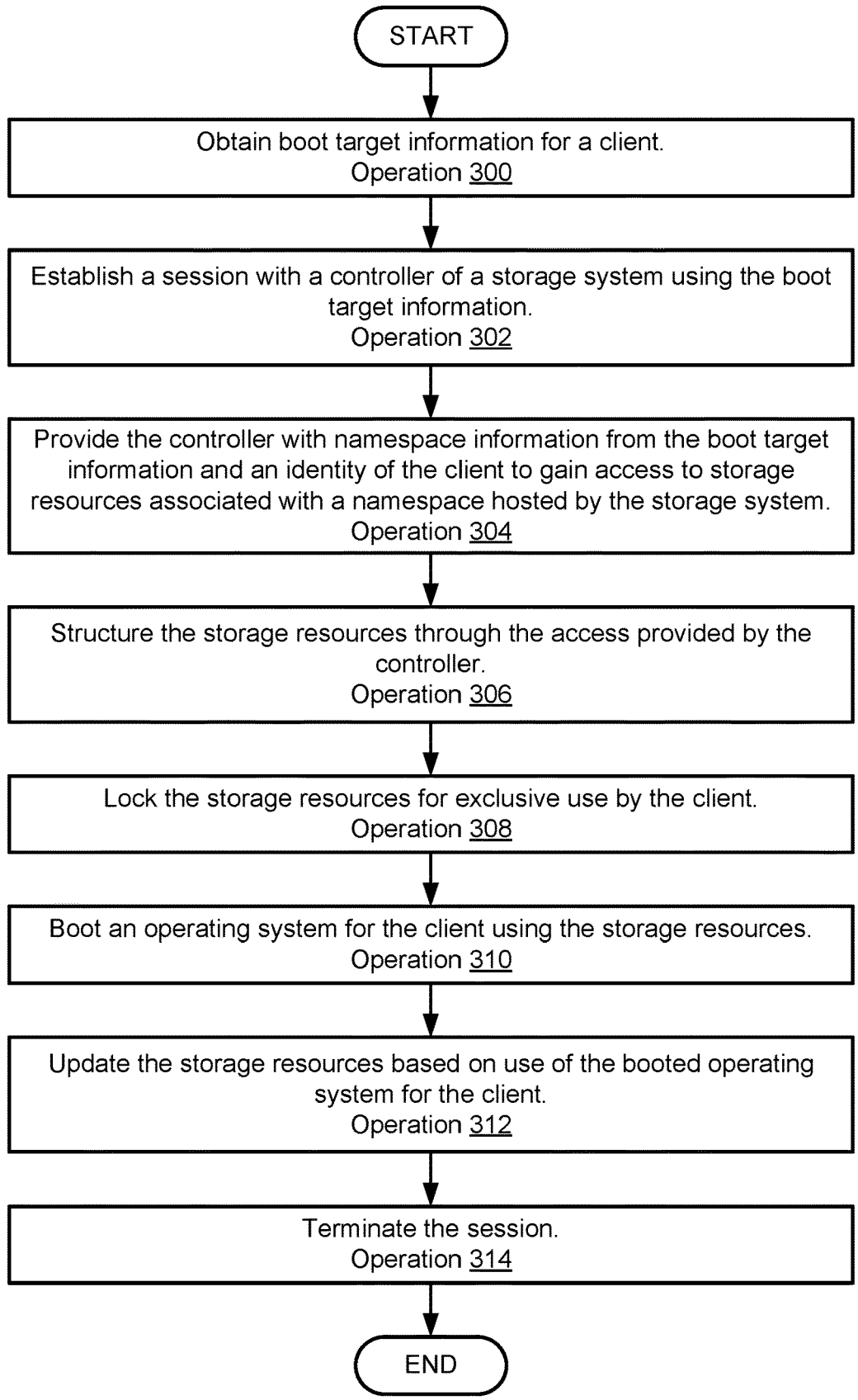
FIG. 3 is a flow diagram illustrating a method of performing a startup of a client in accordance with an embodiment.
Figure 4:
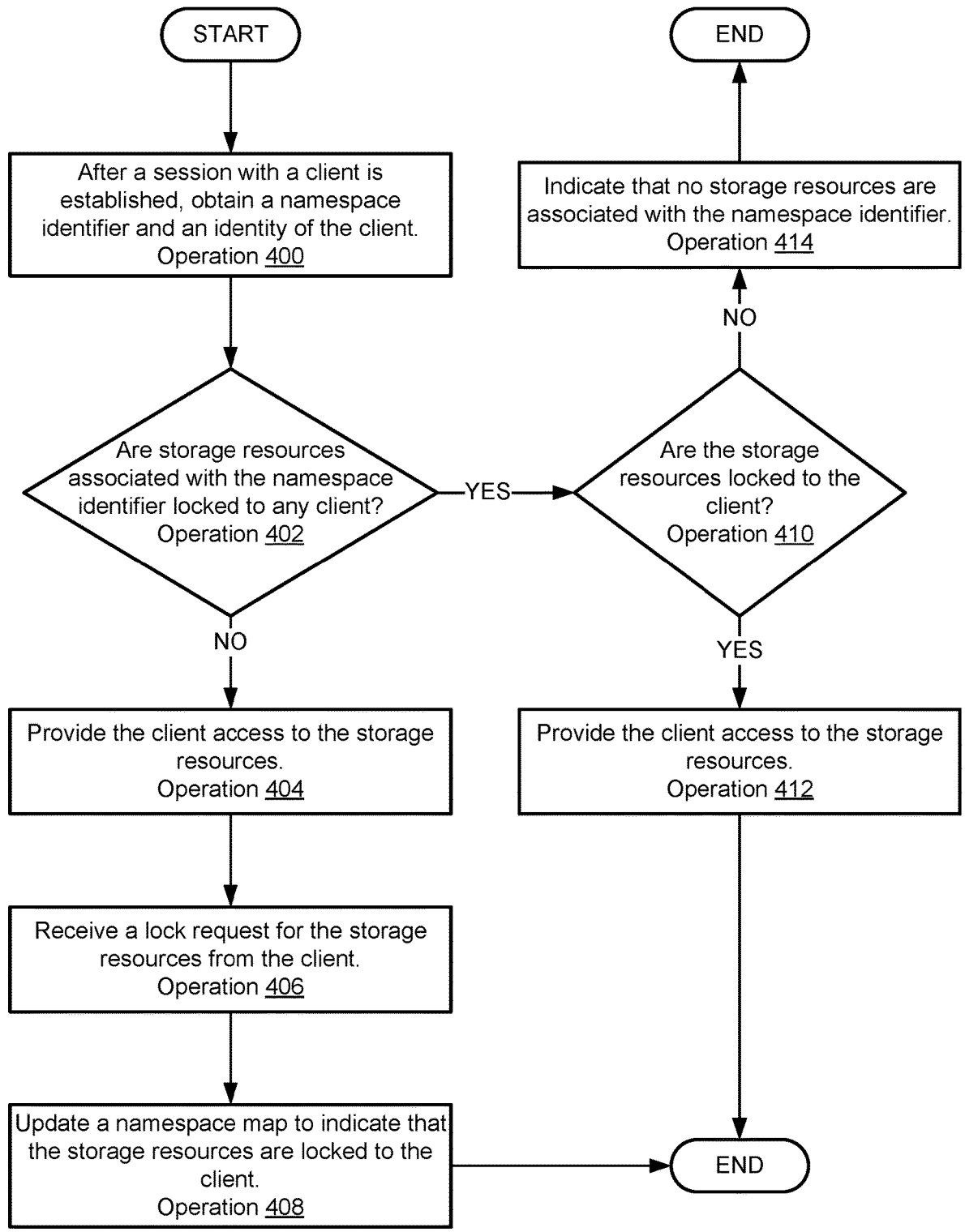
FIG. 4 is a flow diagram illustrating a method of services requests from clients in accordance with an embodiment.

As discussed above, the components of FIG. 1 may perform various methods to increase the likelihood of clients being able to enter predetermined manners of operating using data stored in storage systems accessible by multiple clients by locking some storage resources of the storage systems for exclusive use by corresponding clients. FIGS. 3-4 illustrates examples of methods that may be performed by the components of FIG. 1. In the diagrams discussed below and shown in FIGS. 3-4, any of the operations may be repeated, performed in different orders, and/or performed in parallel with or a partially overlapping in time manner with other operations.

FIG. 3 is a flow diagram illustrating a method of starting a client according to an embodiment.

Prior to operation 300, a client may initiate startup. For example, the client may be power cycled (e.g., powered on, powered off and then on, etc.), may be performing a restart, or may startup for other reasons. When starting up, the client may begin execution of a startup manager which manages operation of the client prior to handoff to an operating system.

At operation 300, boot target information for the client is obtained. The boot target information may be obtained by reading it from storage (local or remote). The boot target information may specify, for example, a namespace identifier, a storage system identifier, a controller identifier, an identifier for the client, and/or other information usable to gain access to a storage system.

In an embodiment, the boot target information does not specify any information when the client has not previously booted to an operating system. In such cases, the boot target information may not exist, and the client may not attempt to read it.

In an embodiment, the boot target information is received via a user interface presented to a user. For example, the startup manager may cause an interface presented to a user of the client to obtain information from the user (e.g., the user may input a namespace identifier and/or other information usable to gain access to data stored in a storage system), the interface may display information regarding previously conducted boots so that a user may make a selection and boot target information corresponding to the selection may be retrieved from storage, etc.

At operation 302, a session with a controller of a storage system is established using the boot target information. In an embodiment, the session is established by a storage system manager. The storage system manager may perform protocol compliant communications (e.g., TCP) with the storage system to establish a communication channel (e.g., supported by a TCP session). The communication channel may be secured with encryption and/or other validation/verification technologies to allow the client to retrieve/send data from/to the storage system with reduced likelihood of the information being obtain by unintended entities, being modified, etc.

At operation 304, the controller is provided with namespace information from the boot target information and an identity of the client to gain access to storage resources associated with a namespace hosted by the storage system.

If the storage resources have not been allocated to the client or for other purposes, then the controller may allocate some storage resources for use by the client and provide the client with a namespace identifier for the namespace associated with the storage resources. The client may then access the storage resources with the namespace identifier. At this point, the client may access the storage resources (e.g., by storing data such as an operating system, configurations for the operating system, etc.) but the storage resources may not be locked to the client.

If the storage resources have been allocated to the client or for other purposes, then the controller may perform a check to determine whether the client should be allowed to access the storage resources. Refer to FIG. 4 for additional details regarding the checking process.

If the storage resources are allocated to other entities for exclusive use, then access to the storage resources may be denied and the client may be required to provide other boot target information to attempt to gain access to storage resources of the storage system.

At operation 306, the storage resources are structured through the access provided by the controller. The client may install a block system, a file system, and/or store other data usable to arrange and define arrangements of the storage system. For example, as part of a process of performing an operating system installation with the storage resources, the client may structure the storage resources prior to storing data for the operating system in the storage resources.

If the storage resources are already structured, then the client may not further modify the structure of the storage resources. For example, if the client is attempting to access data corresponding to an operating system stored in the storage resources, then the client may not further structure the storage resources.

At operation 308, the storage resources are locked for exclusive use by the client. In an embodiment, the storage resources are locked by the client issuing and sending a command to the controller of the storage system. The command may be a configurable lock command. The lock command may include a number of parameters including one or more of (i) an identifier of the client (e.g., a host identifier), (ii) an identifier of the controller, (iii) an identifier of the namespace associated with the storage resources, (iv) an identifier of the storage system, and (v) information regarding the reservation. The information regarding the reservation may specify whether the namespace and associated storage resources should be locked for a duration of time specified by the lock command (or a reference amount) or should be locked until the namespace and associated storage resources are actively unlocked. The namespace and associated storage resources may be actively unlocked by sending an unlock/release command. The client locking the storage resources or an administrator (and/or a different management entity) may unlock the storage resources and associated namespace using the unlock command.

The controller may process the lock and unlock commands. Refer to FIG. 4 for additional details regarding such processing by the controller.

At operation 310, an operating system for the client is booted using the storage resources. The client may be booted by copying data for the operating system from the storage resources into memory. The data may include, for example, executable code, configuration data that may impact the operation of the operating system, and/or other types of data. The data may be copied as part of a TCP boot process with the communication channel.

At operation 312, the storage system resources are updated based on use of the booted operating system for the client. For example, the data in the storage resources may be updated to reflect action performed by the operating system, configurations for the operating system that were changed, and/or other information to reflect the operation of the operating system while executing on the client.

In an embodiment, the session between the client and the storage system may automatically terminate upon the boot to the operating system. After the client has handed over operation to the operating system, the operating system may automatically establish another session with the storage system. To do so, the operating system may send information based on the boot target information such as, for example, the identifier of the namespace and an identifier of the client. In this manner, the operating system may have access to the same storage resource of the storage system to which the startup manager of the client had access. Further, by virtue of the locked state of the storage resources, other entities may not access the storage resources thereby depriving the client of access to the storage resources. Accordingly, it may be more likely that the client will be able to access the storage resources in the future for boot purposes.

After the storage resources are updated, at operation 314, the session between the operating system and the storage resources may be terminated. For example, the termination may occur due to a restart of the client or for other reasons that will require a restart of the operating system.

The method may end following operations 314.

During operations 302-308, a session between the startup manager and the storage system may be in place, whereas in operations 310-314 a session between the operating system (or other management entity) and the storage system may be in place. Access to the storage resources may be granted by the storage system to both the startup manager and operating system using the boot target information usable by and known to both entities.

Turning to FIG. 4, flow diagram illustrating a method of servicing client requests according to an embodiment is shown.

At operation 400, after a session with a client is established, a namespace identifier and an identity of a client may be obtained. The client may provide a controller of a storage system with the identifiers via the session. The session may be a TCP session.

At operation 402, it is determined whether storage resources associated with the namespace identifier are locked to any client. The determination may be made by using the namespace identifier as a key for the namespace map. The namespace identifier may be matched to an entry of the namespace map. The matched namespace map entry may specify a second client identifier (or may not include a client identifier if the namespace is not locked). If a client identifier is present in matched entry, then it may be determined that the storage resources are locked to a client, and the method may proceed to operation 410. Otherwise, the method may proceed to operation 404 by determining that the storage resources are not locked to any client.

At operation 404, the client is provided access to the storage resources. To provide the client access to the storage resources, the controller may service read and write commands from the client directed toward the storage resources.

At operation 406, a lock request for the storage resources are received from the client. The lock request may specify that the storage resources and/or associated namespace are to be locked for exclusive use by the client. For example, the client may store data for boot purposes in the storage resources and may desire to be likely to be able to access them in the future without conflict with other clients.

At operation 408, the namespace map is updated to indicate that the storage resources are locked to the client. The namespace map may be updated by updating the entry matched in operation 402 based on the lock request. For example, the entry may be updated to include an identifier of the client and information regarding the lock request (e.g., duration of the lock or whether an explicit unlock is required). If the entry is updated to indicate a duration of the lock, the controller may start a corresponding timer and automatically update the entry to remove the client identifier after the timer expires, absent further action by the client or other entities.

The method may end following operation 408.

Returning to operation 402, the method may proceed to operation 410 following operation 402 when it is determined that the storage resources are locked to a client.

At operation 410, it is determined whether the storage resources are locked to the client. The determination may be made by comparing a client identifier included in the matched entry of operation 402 to the identity of the client obtained in operation 400. A match between the client identifiers may indicate that the storage resources are locked to the client where a difference may indicate that the storage resources are not locked to the client.

If it is determined that the storage resources are locked to the client, then the method may proceed to operation 412.

Otherwise, it may be determined that the storage resources are not locked to the client, and the method may proceed to operation 414.

At operation 412, the client is provided access to the storage resources. To provide the client access to the storage resources, the controller may service read and write commands from the client directed toward the storage resources.

The method may end following operation 412.

Returning to operation 410, the method may proceed to operation 414 following operation 410 when the storage resources are not locked to the client.

At operation 414, the controller indicates that no storage resources are associated with the namespace identifier. The controller may do so to avoid providing any information regarding the storage resources, and potential data stored therein, to the client.

In an embodiment, the controller indicates that client is denied access to the storage resources. Providing such information to the client may allow the client to infer that there may be some data present in the storage resources but does not indicate the contents therein, the entity that may have access to the data, and/or other information.

The method may end following operation 412.

Figure 5:
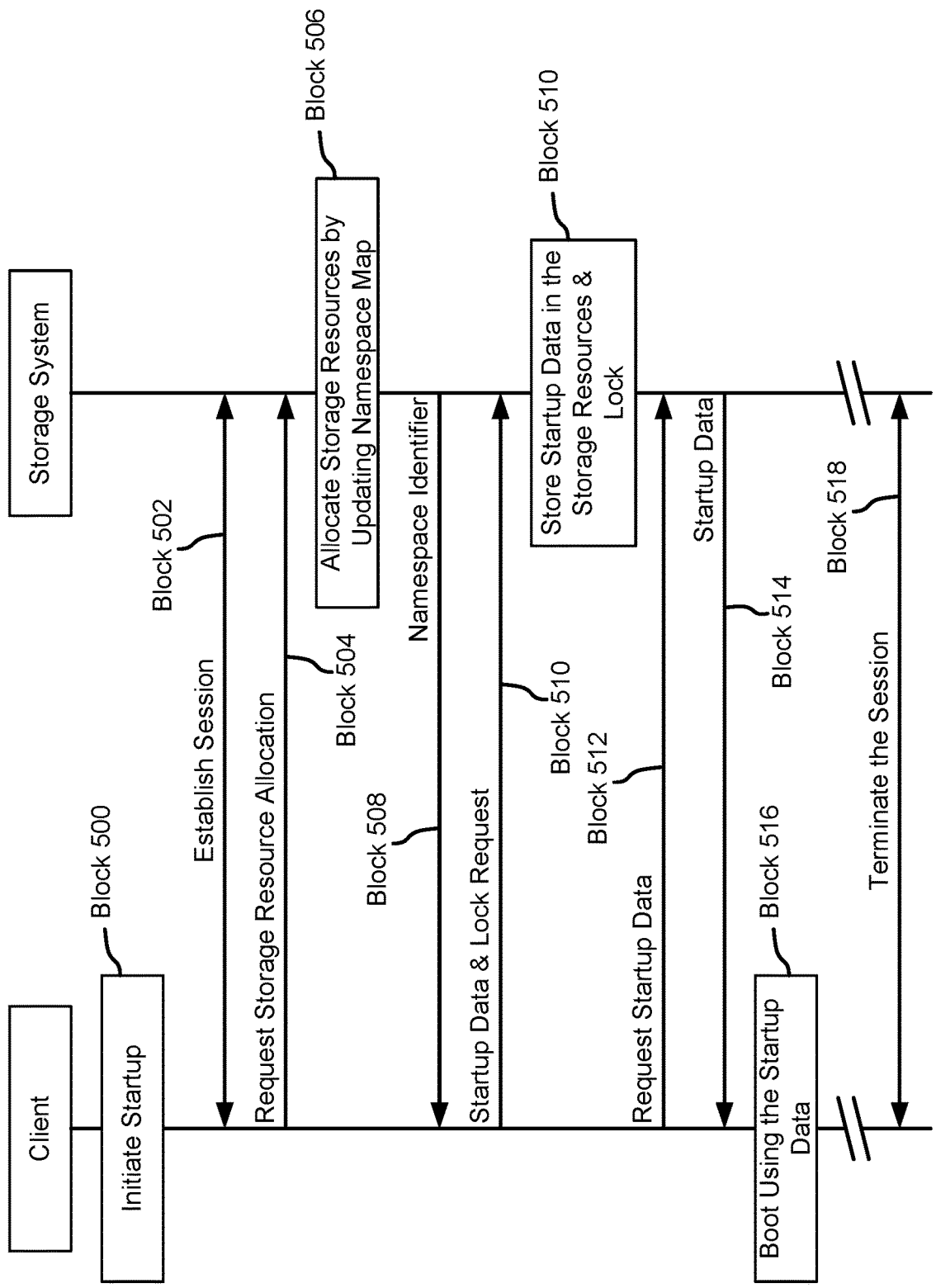
FIG. 5 is a diagram illustrating blocks showing a first startup in accordance with an embodiment.
Figure 6:
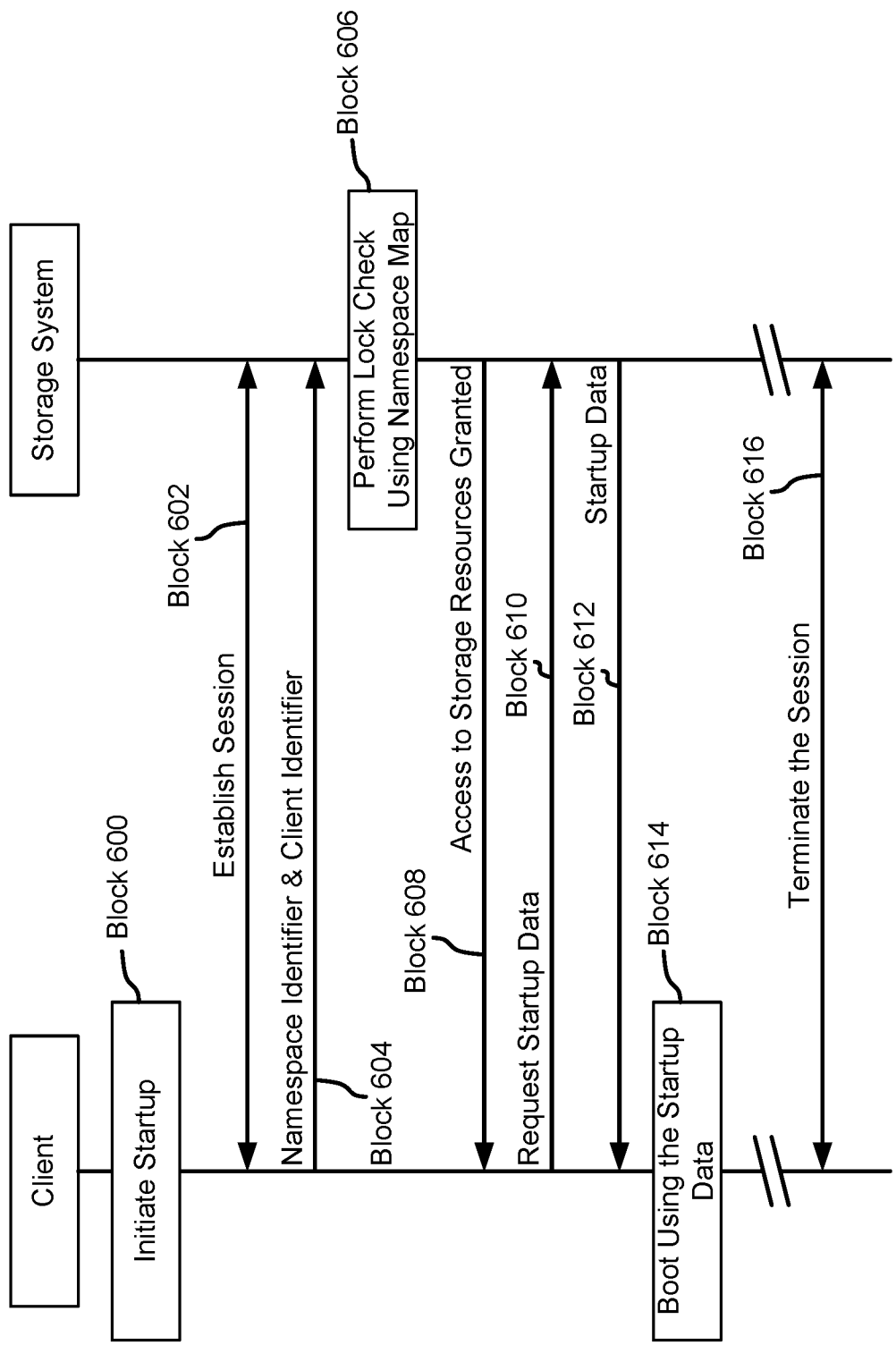
FIG. 6 is a diagram illustrating blocks showing a second startup in accordance with an embodiment.

To further clarify embodiments disclosed herein, action diagrams in accordance with an embodiment are shown in FIGS. 5 and 6. These diagrams illustrate actions and interactions that may be performed by various components shown in FIG. 1. In these diagrams, blocks lower on the page generally indicate actions, functions, etc. performed after actions higher on the page. However, the functions, actions, etc. indicated in each block may be performed in other orders and/or entirely or partially concurrently with other blocks. Lines terminating in arrows between the lines descending from the blocks with "client" and "storage system" indicate communications between the client and storage system whereas the blocks overlaying the descending line indicate actions, functions, etc. substantially performed by the entity from which the line descends.

Turning to FIG. 5, a diagram illustrating actions that may be performed while a client prepares for a boot in accordance with an embodiment is shown.

As seen in block 500, the client may initiate startup. When doing so, the client may begin execution of a startup manager (e.g., by reading instructions from a local read only memory, the instructions when executed giving rise to a bios or other type of client preparation entity, the client preparation entity may be light weight and not allow for the client to provide desired computer implemented services). The startup may be initiated for any reason such as, for example, a restart of the client, a power cycling of the client, etc. In an embodiment, the startup is to install an operating system for handoff to by the startup manager.

As part of the execution of the startup manager, at block 502, a session with a storage system may be established. The session may be established to provide the client with access to storage resources in which startup data may be stored.

After the communication session is established and using the session for communications purposes, at block 504, a storage resource allocation request is sent to the storage system.

At block 506, the storage system allocates a quantity of storage resources for use by the client. When doing so, a namespace may be instantiated (or pre-existing namespace may be utilized). The allocation may be tracked with a namespace map by updating an entity to reflect the namespace for the storage resource allocation, the client, and/or other information.

At block 508, a namespace identifier of the namespace for the quantity of storage resources is provided to the client.

At block 510, the client sends startup data and a lock request to the storage system. The startup data may include, for example, data for an operating system to be executed by the client, configuration settings, and/or other information usable to place the client in a state where the startup manager may handoff management of the client to another entity. While the other entity is managing the operation of the client, the client may be operating in a state where it may be capable of providing desired computer implemented services (e.g., in contrast to while the startup manager is managing the operation of the client). For example, applications or other executable entities that provide the computer implemented services may rely on the operating system for their ability to function properly.

The storage system may also lock the storage resources by updating a namespace map to indicate that only the client is able to access the namespace. For example, an entry of the namespace map may be updated to associated the client with the namespace. Consequently, the storage system may require that both the client identifier and the namespace identifier be provided in the future prior to providing access to the namespace and associated storage resources.

At block 512, the client may send a request for the startup data. In response, at block 514, the storage system may provide the startup data to the client, which may store the startup in memory.

At block 516, the client may use the startup data to boot. During the boot, the startup manager may hand off to an operating system executing with the startup data.

Also, at block 516, the session between the startup manager and the storage system may be terminated by virtue of the handoff. Following handoff to the operating system, the operating system may establish a new session with the storage system using the client identifier and namespace identifier thereby allowing both the startup manager and operating system to access the startup data. Overtime, the operating system may modify the startup data in the storage system.

At some point in the future, the client may need to terminate execution of the operating system (e.g., to perform a restart, shut off, etc.). As part of that process, at block 518, the session between the operating system and the storage system may be terminated.

Turning to FIG. 6, a diagram illustrating actions that may be performed while a client prepares for a boot in accordance with an embodiment is shown.

As seen in block 600, the client may initiate startup. When doing so, the client may begin execution of a startup manager (e.g., by reading instructions from a local read only memory, the instructions when executed giving rise to a bios or other type of client preparation entity, the client preparation entity may be light weight and not allow for the client to provide desired computer implemented services). The startup may be initiated as part of a power on, power cycle, or other type of restart of the client that terminates execution of an operating system and leaves the client in a state in which it is unable to provide desired computer implemented services.

As part of the execution of the startup manager, at block 602, a session with a storage system may be established. The session may be established to provide the client with access to storage resources in which startup data is stored.

At block 604, a namespace identifier and an identifier of the client is provided to the storage system.

At block 606, the storage system performs a lock check using a namespace map. The check may be performed by matching the namespace identifier to an entry in the namespace map and determining whether the matched entity specifies that the client identified by the client identifier has access to the namespace identified by the namespace identifier. If the client has access to the namespace, then, at block 608, the storage system provides access to storage resources associated with the namespace. Otherwise, the storage system denies the client access to the storage resources.

At block 610, the client may request startup data stored in the storage resources from the storage system. In response, at block 612, the storage system provides the client with the startup data.

At block 614, the client may use the startup data to boot to an operating system. During the boot, the startup manager may hand off to an operating system executing with the startup data.

Also, at block 614, the session between the startup manager and the storage system may be terminated by virtue of the handoff. Following handoff to the operating system, the operating system may establish a new session with the storage system using the client identifier and namespace identifier thereby allowing both the startup manager and operating system to access the startup data. Overtime, the operating system may modify the startup data in the storage system.

At some point in the future, the client may need to terminate execution of the operating system (e.g., to perform a restart, shut off, etc.). As part of that process, at block 616, the session between the operating system and the storage system may be terminated.

As seen and illustrated in FIGS. 5-6, the disclosed methods and system may improve the likelihood of successful boot by locking resources of storage systems to particular devices.

Figure 7:
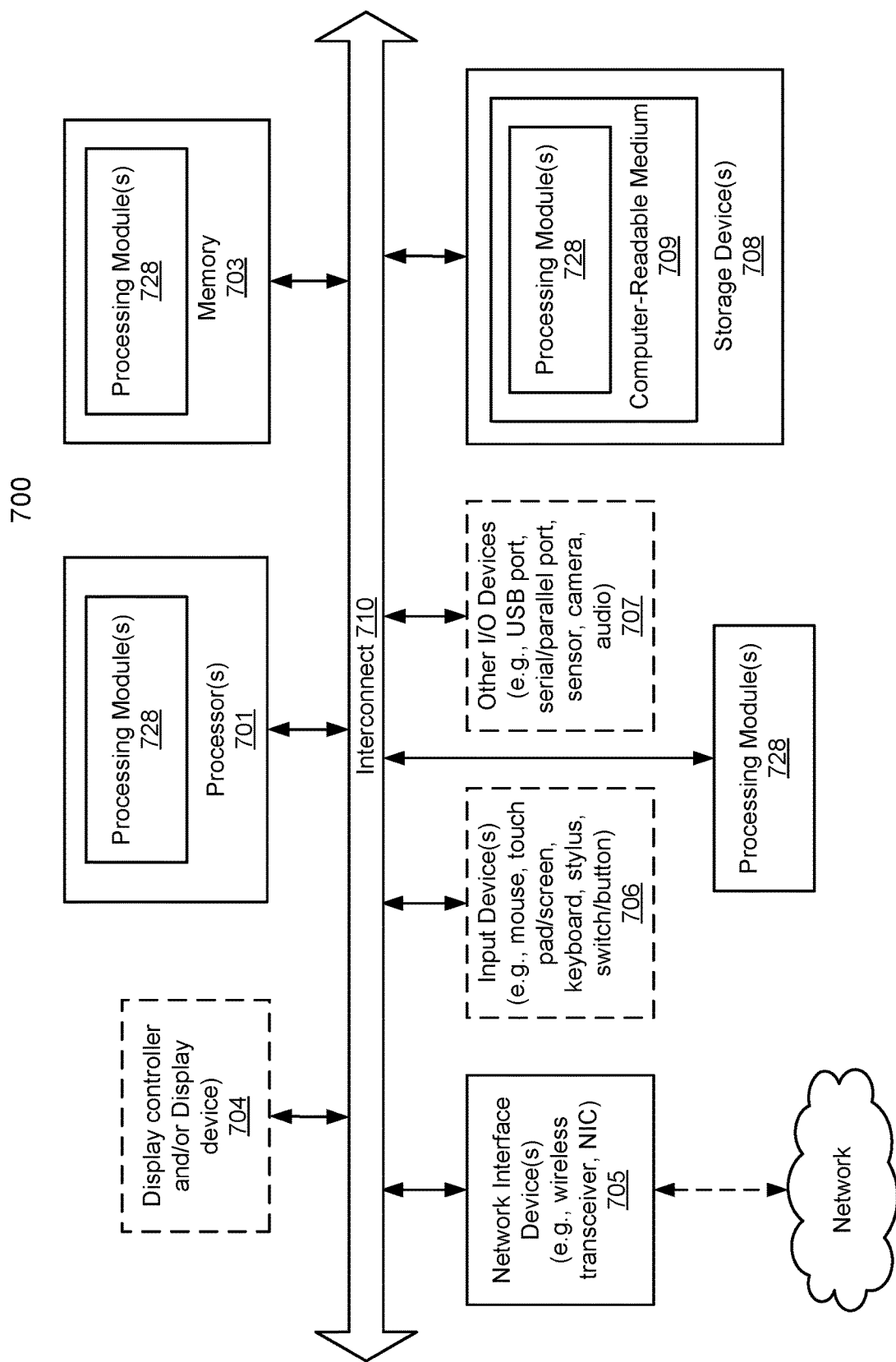
FIG. 7 is a block diagram illustrating a data processing system in accordance with an embodiment.

Any of the components illustrated in FIGS. 1-6 may be implemented with one or more computing devices. Turning to FIG. 7, a block diagram illustrating an example of a data processing system (e.g., a computing device) in accordance with an embodiment is shown. For example, system 700 may represent any of data processing systems described above performing any of the processes or methods described above. System 700 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 700 is intended to show a high level view of many components of the computer system. However, it is to be understood that additional components may be present in certain implementations and furthermore, different arrangement of the components shown may occur in other implementations. System 700 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 700 includes processor 701, memory 703, and devices 705-708 via a bus or an interconnect 710. Processor 701 may represent a single processor or multiple processors with a single processor core or multiple processor cores included therein. Processor 701 may represent one or more general-purpose processors such as a microprocessor, a central processing unit (CPU), or the like. More particularly, processor 701 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 701 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 701, which may be a low power multi-core processor socket such as an ultra-low voltage processor, may act as a main processing unit and central hub for communication with the various components of the system. Such processor can be implemented as a system on chip (SoC). Processor 701 is configured to execute instructions for performing the operations discussed herein. System 700 may further include a graphics interface that communicates with optional graphics subsystem 704, which may include a display controller, a graphics processor, and/or a display device.

Processor 701 may communicate with memory 703, which in one embodiment can be implemented via multiple memory devices to provide for a given amount of system memory. Memory 703 may include one or more volatile storage (or memory) devices such as random access memory (RAM), dynamic RAM (DRAM), synchronous DRAM (SDRAM), static RAM (SRAM), or other types of storage devices. Memory 703 may store information including sequences of instructions that are executed by processor 701, or any other device. For example, executable code and/or data of a variety of operating systems, device drivers, firmware (e.g., input output basic system or BIOS), and/or applications can be loaded in memory 703 and executed by processor 701. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 700 may further include IO devices such as devices (e.g., 705, 706, 707, 708) including network interface device(s) 705, optional input device(s) 706, and other optional IO device(s) 707. Network interface device(s) 705 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 706 may include a mouse, a touch pad, a touch sensitive screen (which may be integrated with a display device of optional graphics subsystem 704), a pointer device such as a stylus, and/or a keyboard (e.g., physical keyboard or a virtual keyboard displayed as part of a touch sensitive screen). For example, input device(s) 706 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 707 may include an audio device. An audio device may include a speaker and/or a microphone to facilitate voice-enabled functions, such as voice recognition, voice replication, digital recording, and/or telephony functions. Other IO devices 707 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 707 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 710 via a sensor hub (not shown), while other devices such as a keyboard or thermal sensor may be controlled by an embedded controller (not shown), dependent upon the specific configuration or design of system 700.

To provide for persistent storage of information such as data, applications, one or more operating systems and so forth, a mass storage (not shown) may also couple to processor 701. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 701, e.g., via a serial peripheral interface (SPI). This flash device may provide for non-volatile storage of system software, including a basic input/output software (BIOS) as well as other firmware of the system.

Storage device 708 may include computer-readable storage medium 709 (also known as a machine-readable storage medium or a computer-readable medium) on which is stored one or more sets of instructions or software (e.g., processing module, unit, and/or processing module/unit/logic 728) embodying any one or more of the methodologies or functions described herein. Processing module/unit/logic 728 may represent any of the components described above. Processing module/unit/logic 728 may also reside, completely or at least partially, within memory 703 and/or within processor 701 during execution thereof by system 700, memory 703 and processor 701 also constituting machine-accessible storage media. Processing module/unit/logic 728 may further be transmitted or received over a network via network interface device(s) 705.

Computer-readable storage medium 709 may also be used to store some software functionalities described above persistently. While computer-readable storage medium 709 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 728, components and other features described herein can be implemented as discrete hardware components or integrated in the functionality of hardware components such as ASICS, FPGAs, DSPs or similar devices. In addition, processing module/unit/logic 728 can be implemented as firmware or functional circuitry within hardware devices. Further, processing module/unit/logic 728 can be implemented in any combination hardware devices and software components.

Note that while system 700 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments of the invention as described herein.

In the foregoing specification, embodiments have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for operating a client during startup from power-on to handing off to a booted operating system, the method comprising:
    establishing, by a startup manager of the client, a first session with a controller of a storage system in which startup data for the client is stored, the storage system being operably connected to multiple clients;
    providing, by the startup manager, namespace information associated with storage resources of the storage system in which the startup data is stored and an identity of the client to obtain access to the storage resources, the storage resources being locked by the storage system for exclusive use by the client;
    copying, by the startup manager, a portion of the startup data to memory using the access to the storage resources;
    booting, by the startup manager, the client to the operating system and terminating the first session;
    establishing, by the operating system, a second session with the storage system to obtain access to the storage resources; and
    updating, by the operating system, the startup data in the storage resources to change a future boot to the operating system.

2. The computer-implemented method of claim 1, further comprising:
    prior to establishing the first session with the controller and during a previous session with a second controller of the storage system:
        requesting, by the startup manager, a storage resource allocation for the storage resources;
        obtaining, by the startup manager, the namespace information as a response to the storage resource allocation request;
        storing, by the startup manager, the startup data in the storage resources; and
        requesting, by the startup manager, that the storage resources be locked to the client.

3. The computer-implemented method of claim 2, wherein requesting that the storage resources be locked to the client comprises:
    generating a data structure specifying:
        an identifier of the client;
        an identifier of the second controller;
        the namespace information;
        an identifier of the storage system; and
        a reservation type.

4. The computer-implemented method of claim 3, wherein the reservation type is a timer based reservation indicating that the storage resources are to be locked to the client for a duration of time.

5. The computer-implemented method of claim 3, wherein the reservation type is a command based reservation indicating that the storage resources are to be locked to the client until an explicit unlock resources request for the storage resources and from the client is processed by the storage system.

6. The computer-implemented method of claim 1, wherein establishing the first session with the controller comprises:
    establishing, by the startup manager, an internet protocol connection to the storage system;
    receiving, by the startup manager, an identifier of the controller; and
    communicating, by the startup manager, with the identified controller using the transmission control protocol and/or internet protocol.

7. The computer-implemented method of claim 6, wherein the client, the multiple clients, and the storage system are operably connected via an internet protocol based fabric.

8. A non-transitory machine-readable medium having instructions stored therein, which when executed by a processor, cause the processor to operate a client during startup from power-on to handing off to a booted operating system, the operations comprising:
    establishing, by a startup manager of the client, a first session with a controller of a storage system in which startup data for the client is stored, the storage system being operably connected to multiple clients;
    providing, by the startup manager, namespace information associated with storage resources of the storage system in which the startup data is stored and an identity of the client to obtain access to the storage resources, the storage resources being locked by the storage system for exclusive use by the client;
    copying, by the startup manager, a portion of the startup data to memory using the access to the storage resources;
    booting, by the startup manager, the client to the operating system and terminating the first session;
    establishing, by the operating system, a second session with the storage system to obtain access to the storage resources; and
    updating, by the operating system, the startup data in the storage resources to change a future boot to the operating system.

9. The non-transitory machine-readable medium of claim 8, wherein the operations further comprise:
    prior to establishing the first session with the controller and during a previous session with a second controller of the storage system:
        requesting, by the startup manager, a storage resource allocation for the storage resources;
        obtaining, by the startup manager, the namespace information as a response to the storage resource allocation request;
        storing, by the startup manager, the startup data in the storage resources; and
        requesting, by the startup manager, that the storage resources be locked to the client.

10. The non-transitory machine-readable medium of claim 9, wherein requesting that the storage resources be locked to the client comprises:
generating a data structure specifying:
an identifier of the client;
an identifier of the second controller;
the namespace information;
an identifier of the storage system; and
a reservation type.

11. The non-transitory machine-readable medium of claim 10, wherein the reservation type is a timer based reservation indicating that the storage resources are to be locked to the client for a duration of time.

12. The non-transitory machine-readable medium of claim 10, wherein the reservation type is a command based reservation indicating that the storage resources are to be locked to the client until an explicit unlock resources request for the storage resources and from the client is processed by the storage system.

13. The non-transitory machine-readable medium of claim 8, wherein establishing the first session with the controller comprises:
establishing, by the startup manager, an internet protocol connection to the storage system;
receiving, by the startup manager, an identifier of the controller; and
communicating, by the startup manager, with the identified controller using the transmission control protocol and/or internet protocol.

14. The non-transitory machine-readable medium of claim 13, wherein the client, the multiple clients, and the storage system are operably connected via an internet protocol based fabric.

15. A client, comprising:
a processor; and
a memory coupled to the processor to store instructions, which when executed by the processor, cause the processor to perform operations operating the client during startup from power-on to handing off to a booted operating system, the operations comprising:
establishing, by a startup manager of the client, a first session with a controller of a storage system in which startup data for the client is stored, the storage system being operably connected to multiple clients;
providing, by the startup manager, namespace information associated with storage resources of the storage system in which the startup data is stored and an identity of the client to obtain access to the storage resources, the storage resources being locked by the storage system for exclusive use by the client;

copying, by the startup manager, a portion of the startup data to memory using the access to the storage resources;
booting, by the startup manager, the client to the operating system and terminating the first session;
establishing, by the operating system, a second session with the storage system to obtain access to the storage resources; and
updating, by the operating system, the startup data in the storage resources to change a future boot to the operating system.

16. The client of claim 15, wherein the operations further comprise:
prior to establishing the first session with the controller and during a previous session with a second controller of the storage system:
requesting, by the startup manager, a storage resource allocation for the storage resources;
obtaining, by the startup manager, the namespace information as a response to the storage resource allocation request;
storing, by the startup manager, the startup data in the storage resources; and
requesting, by the startup manager, that the storage resources be locked to the client.

17. The client of claim 16, wherein requesting that the storage resources be locked to the client comprises:
generating a data structure specifying:
an identifier of the client;
an identifier of the second controller;
the namespace information;
an identifier of the storage system; and
a reservation type.

18. The client of claim 17, wherein the reservation type is a timer based reservation indicating that the storage resources are to be locked to the client for a duration of time.

19. The client of claim 15, wherein the reservation type is a command based reservation indicating that the storage resources are to be locked to the client until an explicit unlock resources request for the storage resources and from the client is processed by the storage system.

20. The client of claim 19, wherein establishing the first session with the controller comprises:
establishing, by the startup manager, an internet protocol connection to the storage system;
receiving, by the startup manager, an identifier of the controller; and
communicating, by the startup manager, with the identified controller using the transmission control protocol and/or internet protocol.

* * * * *